J. W. MOWBRAY.
HYDRAULIC CONTROL FOR TRACTORS.
APPLICATION FILED JAN. 4, 1919.
1,358,974.
Patented Nov. 16, 1920.
4 SHEETS—SHEET 1.
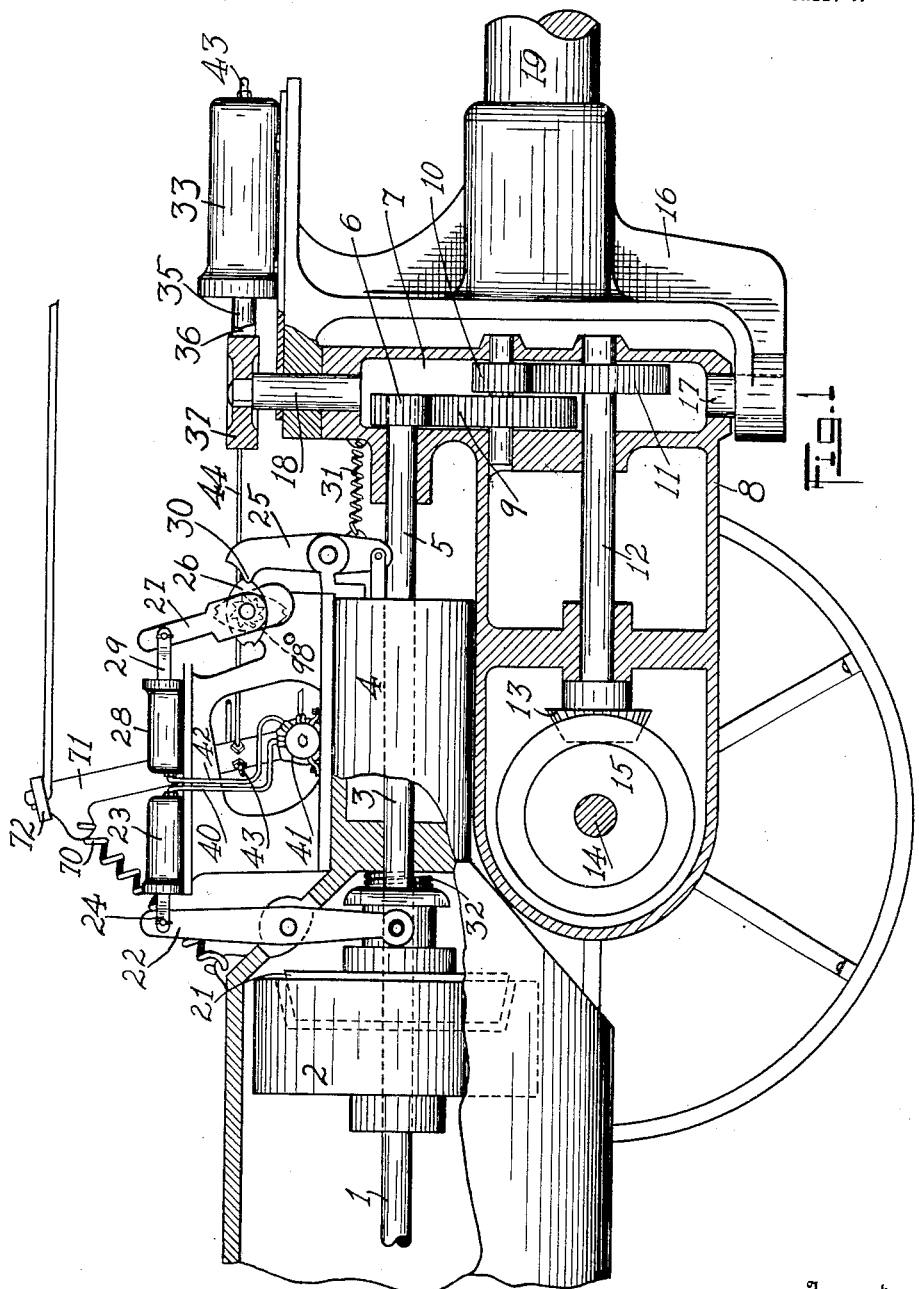
Inventor
James W. Mowbray
Witness
William Sestok
By Charles E. Wiser
Attorney J. W. MOWBRAY.
HYDRAULIC CONTROL FOR TRACTORS.
APPLICATION FILED JAN. 4, 1919.
1,358,974.
Patented Nov. 16, 1920.
4 SHEETS—SHEET 2.
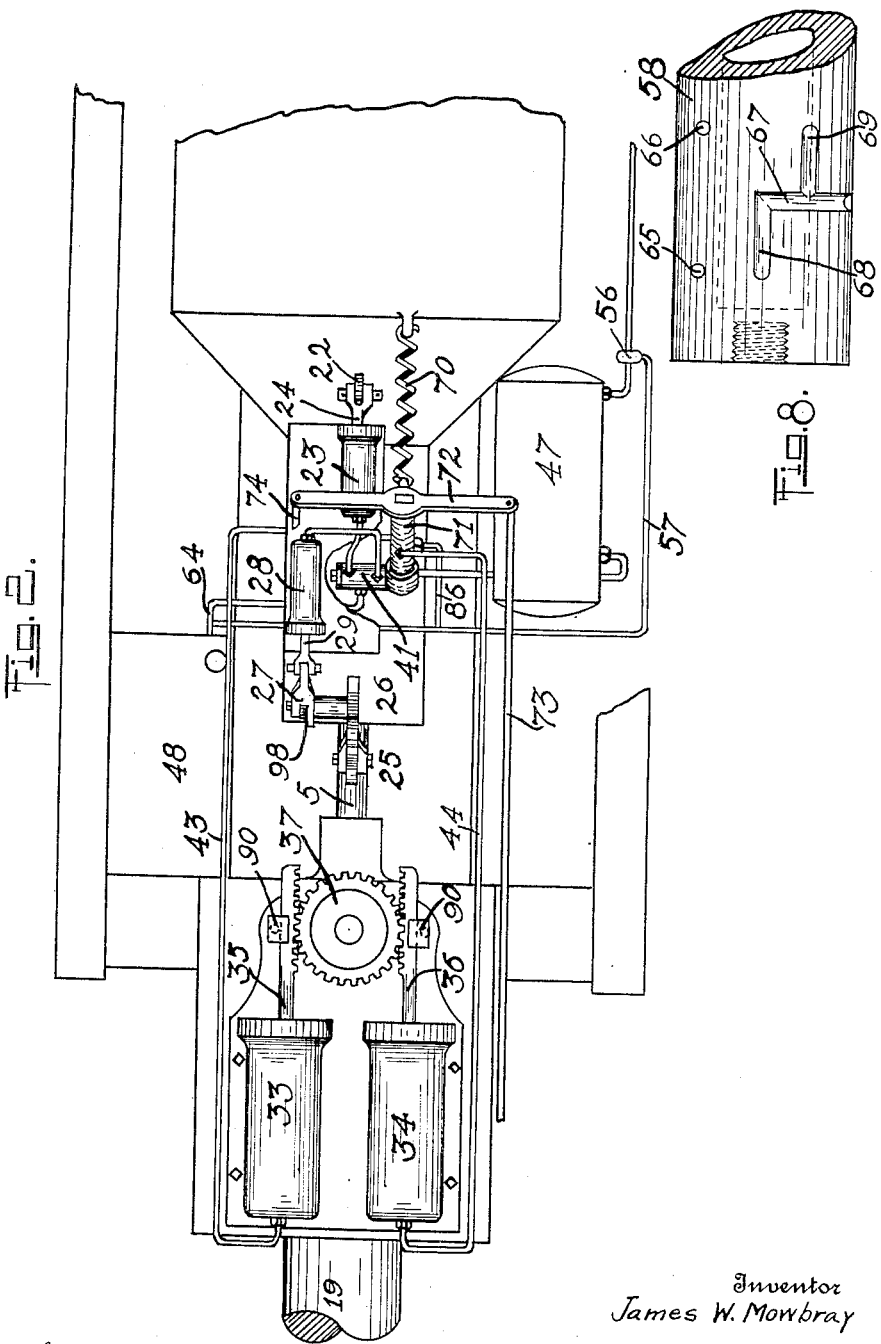
Witness
William Seato K
Inventor
James W. Mowbray
By Charles E. Wiener
Attorney

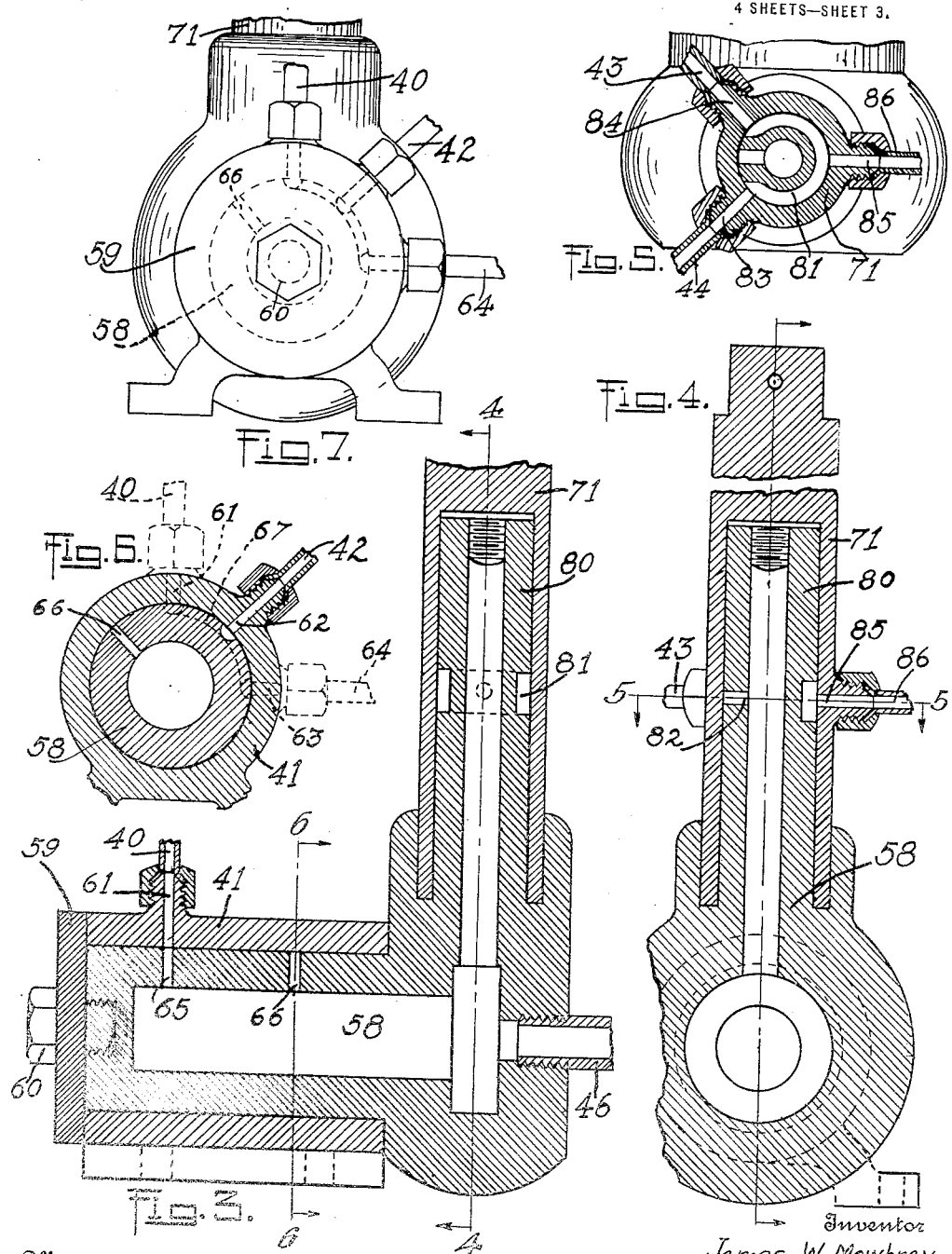

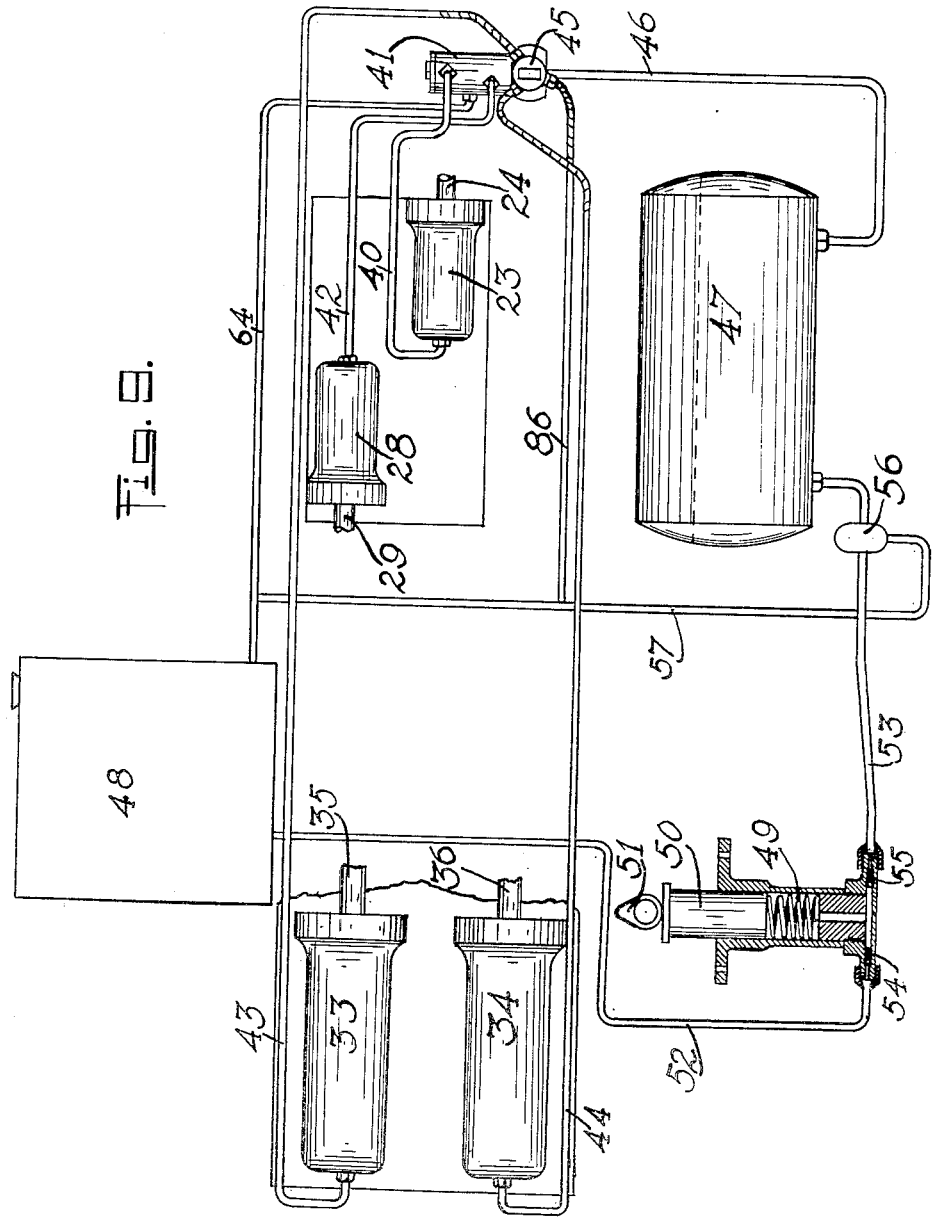

UNITED STATES PATENT OFFICE.

JAMES W. MOWBRAY, OF WINDSOR, ONTARIO, CANADA, ASSIGNOR, BY MESNE ASSIGNMENTS, TO THE AUTOMOTIVE CORPORATION, OF FORT WAYNE, INDIANA, A CORPORATION OF DELAWARE.

HYDRAULIC CONTROL FOR TRACTORS.

1,358,974.  Specification of Letters Patent.  Patented Nov. 16, 1920.

Application filed January 4, 1919. Serial No. 269,714.

*To all whom it may concern:*

Be it known that I, JAMES W. MOWBRAY, a subject of the King of Great Britain, residing at Windsor, county of Essex, Province of Ontario, Canada, have invented a certain new and useful Improvement in Hydraulic Control for Tractors, and declare the following to be a full, clear, and exact description of the same, such as will enable others skilled in the art to which it pertains to make and use the same, reference being had to the accompanying drawings, which form a part of this specification.

This invention relates to hydraulic control devices for automotive vehicles, and its object is to provide a hydraulic control adapted to be actuated through operation of a pair of lines to guide and to stop and start the vehicle. The preferable form of the vehicle is shown in my pending application Serial No. 253,857, filed September 13, 1918, which is a tractor of the two-wheeled type utilizing a suitable power plant, preferably an internal combustion engine. This invention relates more particularly to the controlling of the clutch and steering mechanism and speed-changing power transmission by operation of pistons individual thereto actuated by means of fluid under pressure. A further object of the invention is to provide a device for controlling the flow of fluid actuated by means of a pair of lines whereby the device may be controlled solely by pulling upon or releasing the said pair of lines either jointly or singly as the case may require. Various novel features of the invention are involved in the mechanism employed for the several functions, and these objects and novel features are hereinafter more fully described and claimed and shown in the accompanying drawings in which—

Figure 1 is a side elevation partly in section of a portion of a tractor showing my improved hydraulic control.

Fig. 2 is a plan view thereof.

Fig. 3 is a vertical section of the valve mechanism used in controlling the flow of fluid to the various pistons.

Fig. 4 is a section taken on line 4—4 of Fig. 3.

Fig. 5 is a view partly in section taken on line 5—5 of Fig. 4.

Fig. 6 is a cross section taken on line 6—6 of Fig. 3, showing a slightly different relationship of the case and valve.

Fig. 7 is an end view taken from the left side of Fig. 3.

Fig. 8 is a detail of part of the valve member shown in section in Fig. 3.

Fig. 9 is a diagram illustrating the control and flow of fluid to the various instrumentalities.

The tractor, as before stated, is preferably of the two-wheeled type and (although not here shown) is understood to be operated by any convenient prime mover, the shaft of which is indicated at 1 in Fig. 1. Power is transmitted through the shaft and clutch member 2 to the shaft 3 of the transmission device understood to be inclosed within the case 4 and from the transmission device extends a shaft 5 having thereon a gear 6 positioned within the chamber 7 formed at one end of the main casting 8. This gear 6 meshes with a gear 9 on the shaft of which is a gear 10 driving a gear 11 on what I have termed the drive shaft 12. On this shaft is a bevel pinion 13 driving the axle 14 by means of a gear 15, of a differential gear group, the axle being a two-part axle as is usual where differential mechanism is employed. To the rear of the casing 8 is pivotally mounted a yoke 16 being supported thereon by means of a stud 17 at the lower end and shaft 18 at the upper end. The shaft 18 is keyed to the casing and the yoke pivots thereon and the stud 17 pivots in the casing at the lower end so that the yoke may freely turn on this casing. To the yoke is attached a bar 19 and it is to be understood that this bar is utilized in attaching a load to the vehicle. The clutch member 2 has a companion clutch member 21 which may be moved longitudinally of the shaft 3 by means of a pivoted lever 22 to engage or disengage the clutch. This lever 22 is controlled by a piston within the cylinder 23 which is attached to the lever by means of a piston rod 24.

The gear shifting device, as more fully described hereinafter, is controlled by means of the pivoted lever 25, and this in turn is actuated through operation of a star wheel 26. The star wheel is actuated by means of a lever 27 and ratchet 98 on the shaft of the lever and star wheel and to which shaft the star wheel is keyed. This star wheel 26 and lever 25 are practically identical in operation with the similar star wheel and lever of my former application for U. S. patent heretofore mentioned. In this present application the lever 27 is controlled by means of a piston within a cylinder 28 having a piston rod 29 connected with the lever 27, and upon movement of the piston outward, the star wheel is turned and inward movement of the piston simply turns the lever 27 without actuation of the star wheel. This star wheel engages the point 30 on the lever 25 as shown in the drawing and on a succeeding movement of the piston and rod 29, the star wheel is turned to allow the point 30 to rest between two points of the star wheel to which position it is drawn by means of a spring 31 at the bottom end of the lever. Therefore, by successive actuations, the lever 27 first moves the lever 25 outward and then releases the lever 25 to action by the spring 31. This lever merely throws the reverse gear into and out of operative relation with the transmission mechanism. The clutch is likewise controlled through operation of the piston in the cylinder 23, outward movement of the piston releasing the clutch and, upon release of pressure within the cylinder, the spring 32 sets the clutch 21 in engagement with the companion member 2.

The device is steered by means of the two cylinders 33 and 34 in each of which is a piston. The piston rods 35 and 36 respectively are formed with rack teeth at the outer ends and upon adjacent sides which mesh with a gear 37 on the fixed shaft 18. Upon fluid under pressure being discharged into one of the cylinders the rod therefor will be moved outwardly and these pistons are both mounted upon and swing with the yoke 16, as will be readily understood from Fig. 1. As the gear is fixed in position and non-rotative outward movement of a piston rod causes the yoke to swing on its pivots, the resultant effect of which is to steer the vehicle in operation.

These several operations are controlled by a single pair of lines, that is—the vehicle may be stopped or started, made to move forward or reverse, and turn to the right or left merely through the manipulation of these two lines. The mechanism controlling the flow of fluid to the several cylinders mentioned is shown in detail in Figs. 3 to 7 inclusive, and the manner of control of flow of fluid will be readily understood from the diagram Fig. 9. The cylinder 23 in the preferred form of construction is supplied with oil under pressure by a line 40 connected with the horizontal portion 41 of the valve case and fluid may be supplied to or discharged from the cylinder by means of this line as hereinafter shown. The cylinder 28 is provided with fluid under pressure by the line 42 also connected with the horizontal portion 41 of the valve case. The cylinder 33 is supplied by means of pipe 43 and the cylinder 34 by means of a pipe line 44, the last two mentioned lines being connected with the vertical portion 71 of the control device. Fluid under pressure is supplied to the control device by means of a line 46 leading from the pressure cylinder 47. The pressure cylinder is a sealed cylinder, oil being forced thereinto as hereinafter shown, compressing air in the upper part of the cylinder which provides constant pressure on the fluid. A supply source is provided by means of a tank 48, and these tanks 47 and 48 may be conveniently located in the framework of the vehicle as is indicated in Fig. 2. To produce the desired pressure in the tank 47, a pump 49 is provided having a plunger 50, spring actuated in one direction and forced in the opposite direction by means of a rotatable cam 51, and it is to be understood that this cam is connected in any approved manner with the prime mover of the vehicle so that it is constantly rotated and the plunger continually reciprocated in its case. The plunger is supplied with fluid from the tank 48 by means of a pipe 52 and fluid is discharged from the pump by means of a pipe 53 connected with the lower side of the pressure tank 47. The pump casing is provided with suitable valves 54 and 55 whereby the upward movement of the plunger draws oil into the case and downward movement closes the valve 54 and opens the valve 55 forcing the liquid through the tube 53 into the cylinder 47. In the line 53 I have provided an automatic valve indicated by the case 56. This is a commonly known valve, and upon certain predetermined pressure being attained in the cylinder 47, this valve mechanism opens the line 53 to a return line 57 connected with the supply tank 48 so that the pump may be continually operated without excessive pressure being produced in the cylinder 47, the valve in the case 56 preventing attainment of a pressure higher than that desired.

The control valve is shown in Figs. 3 to 7 inclusive, and this consists of a hollow L-shaped member, the horizontal portion 58 of which is ground to seat in the horizontal case 41. This member 58 being ground to fit the casing, no leakage of oil may result, and the member is held in the case by means of a plate 59 and the bolt 60, and fluid under pressure is led into the central chamber of this L-shaped member by means of the pipe 46. The case 41 has three ports opening to the interior of the case that are out of alinement both longitudinally and circumferentially of the case. These ports are indicated in Fig. 6 at 61, 62 and 63. The line 40 for the cylinder 23 is connected with the port 61 of the case and the line 42 is connected with the port 62 of the case and the port 63 of the case is connected with the relief line 64 leading from the casing to the supply tank 48. The horizontal portion 58 of the control member is provided with two ports 65 and 66 that are in alinement longitudinally of the cylinder, the port 65 being adapted to register with the port 61 of the case and the port 66 adapted to register with the port 62 of the case. The ports 65 and 66 being in alinement and the ports 61 and 62 being out of alinement longitudinally of the case and circumferentially, but one port 61 or 62 may be opened to the interior of the control member at a single interval. Thus, by rotation of the member 58 in the case, the port 65 may be brought to registration with the port 61 and fluid under pressure discharged through the pipe 40 to the cylinder 23, or the port 66 may be brought into registration with its companion port. A plan view of the horizontal portion 58 of the control valve is shown in Fig. 8 which shows the alined ports 65 and 66. Spaced from the ports is a channel 67 and this channel, when the port 58 is turned to the necessary extent, has a portion 68 which will register with the port 61 of the case and a part 69 that will register with the port 62 of the case, and the main portion 67 registers with the port 63 of the case which opens to the relief line. Thus, when parts of the groove 68 and 69 are in registration with the ports 61 and 62 of the case to which the lines 40 and 42 are connected, these lines are connected by means of the grooves with the relief line and this will relieve the pressure in the lines and the cylinders connected therewith.

It is to be noted in Fig. 2 that the vertical portion of the control member has a spring 70 connected therewith to always turn the valve member in one direction in the case 41, the construction being such that the valve member normally occupies the position shown in Fig. 6 with the groove 67 registering with the ports 61, 62 and 63. Upon pulling the vertical portion 71 of the valve member backward from the position shown in Fig. 2, the first result is that the port 65 is brought into registration with the port 61 which delivers oil under pressure to the cylinder 23. The piston of this cylinder, as shown particularly in Fig. 1, is connected by means of a piston rod 24 with the lever 22 and pressure in the cylinder disengages the clutch member and the power plant is thus disconnected from the driving mechanism. If the member 58 is continued in its rotation, the port 66 of the valve is brought to registration with the port 62 of the case which delivers oil under pressure through the line 42 to the cylinder 28 and actuation of the piston therein operates the gear shift lever 25 which will be held in the actuated position by means of the star wheel 26. The position of the lever 25 in Fig. 1 is the position when the reverse gear is out of operative relation with the transmission gearing and upon actuation of the piston in the cylinder 28 and the lever 27 the star wheel is turned to allow the spring 31 to actuate the lever which places the reverse gear in operative relation. A succeeding actuation of the lever 27 will again place the lever 25 in the position shown with the reverse gear disengaged. It is to be noted that when the valve member 58 is turned to bring the port 66 thereof in registration with the port 62 of the case, the port 61, which on initial movement of the valve member has supplied the cylinder 23 with pressure, is not relieved of pressure by the continuation of the movement to bring the ports 62 and 66 into registration. Thus, when the valve member is turned to actuate the reverse gear mechanism, the pressure in the cylinder 23 will hold the clutch disengaged as is required to enable the reverse gear to be shifted. The stem 71 of the valve control device is provided with a bar 72 at the upper end thereof. The line 73 is connected with one end of this bar and the line 74 is connected with the other end thereof. By pulling equally upon both the lines the horizontal portion 58 of the valve may be turned in its seat and oil under pressure distributed in the manner heretofore stated. The vertical portion 80 of the valve fits in the stem 71, the parts being ground to fit whereby leakage is prevented. The portion 80 of the valve between its ends is provided with a partially circumferential recess 81 shown particularly in Fig. 5, and in alinement with the said recess circumferentially of the stem, and in the part of the stem not cut away is provided a port 82, which port contacts the inner wall of the part 71, as will be readily understood. This part 71 has three ports therein—namely, 83, 84 and 85. The port 83 has the line 44 connected therewith and the port 84 has the line 43 connected therewith and the port 85 has the line 86 connected therewith, and this last line leads into the line 57 and is a relief line. The several lines at the point of connection with the case 71 are flexible to allow the case to turn. In the construction shown the outer case or stem 71 is revoluble on the part 80 to bring the port 83 or 84 into registration with the port 82 and this is accomplished by pulling upon the line 73 or the line 74. The spring 70 being connected with the forward side of the stem 71 tends to hold it in central position which is the neutral position of the parts indicated in Fig. 5 in which position both the lines 43 and 44 are opened to the relief line 86. Upon pulling upon one line, as for instance the line 73, the port 84 is brought to registration with the port 82 of the central member 80 causing the piston in the cylinder 34 to be moved outward and in this position the port 83 is opened by means of the groove 81 to the relief line and projection of the rack 36 by means of the piston in the cylinder 34 tends to turn the yoke to the left of the longitudinal axis of the machine as will be understood from Fig. 2, resulting in the vehicle being turned to the left. The pull upon the right hand line likewise turns the vehicle to the right. The two piston rods 35 and 36 are held in engagement with the gear 37 by means of blocks 90 which may be provided with rollers as indicated in dotted lines in Fig. 2.

The operation of the device is simple in the extreme and it is preferable when the vehicle is to stand idle either with or without the engine being in operation to have the lines drawn up to such point that the port 65 in the horizontal part 58 of the valve is in registration with the port 61 of the case which causes the clutch to be disengaged, and any convenient means may be employed to hold the line mechanically in such position if so desired. If it be desired to start the vehicle (it being understood that the engine is running), it is only necessary to release the lines from the held position above indicated whereupon the spring returns the valve member to normal position which is the position indicated in Fig. 6. This relieves the pressure in the line 40 through the groove 67 and port 63 and the spring 32 thereupon sets the clutch and starts the vehicle. If it be desired to stop the vehicle, the lines are pulled to again bring the port 65 in registration with the port 61. This withdraws the clutch and stops the forward movement of the vehicle.

If it be determined to back the vehicle, the lines are pulled backward to a further extent until the port 66 is in registration with the port 62. This actuates the lever 27 and turns the star wheel allowing the point of the lever 25 to drop between the points of the star wheel and a spring 31 to move the reverse gear into operative relation. Thereupon the lines are entirely released to action by the spring 70 which allows the clutch to again become engaged and the vehicle will move in reverse direction. If it be decided to stop such motion the lines are pulled upon to bring the port 65 in registration with the port 61 which disengages the clutch and if it be desired to disengage the reverse gear, a further pull will actuate the star wheel bringing a succeeding point thereof into engagement with the point 25 which is the position shown in full lines in Fig. 1, and this disengages the reverse gear. Thereupon, the lines may be released to action by the spring 70 and the vehicle will again move forward on engagement of the clutch. Thus, by simply pulling upon the lines to a predetermined extent the vehicle may be stopped or started in either forward or backward direction. Also, by the described arrangement of the vertical portion of the valve member and shell or case 71 thereon, by pulling upon the right or left line the vehicle may be turned to the right or left as will be understood from the previous description and, therefore the entire control of the vehicle is accomplished through the use of a single pair of lines allowing the operator to be stationed upon the load hauled instead of upon the vehicle itself, and the vehicle controlled after the manner of control of a horse.

From the foregoing description, it will also be evident that the control device is simple and inexpensive in character and is fully as effective in operation as the usual mechanical appliances utilized to perform similar functions.

What I claim is—

1. In a self-propelled vehicle, a power plant, driving mechanism, a clutch interposed between the power plant and driving mechanism for connecting and disconnecting the same, a lever adapted upon movement in one direction to disengage the clutch, a spring operating to engage the clutch upon release of the lever, a control device for the lever adapted upon moving a portion of its distance to move the lever to disengage the clutch and upon succeeding movement to release the lever and permit operation of the clutch by its spring, and fluid pressure operated means for intermittently turning the said lever control device.

2. In a self-propelled vehicle, a power plant and a driving mechanism therefor, a clutch interposed between the power plant and driving mechanism, a reverse gear mechanism, a pivoted lever for operating the clutch in one direction, a spring for moving the clutch in the opposite direction upon release of the lever, a second lever for the reverse gear mechanism, similar lever actuating devices for each lever adapted upon being turned to move the respective lever and upon being turned a further predetermined distance to release the lever, and fluid pressure controlled means for each lever actuating device adapted to intermittently actuate the same.

3. In a vehicle, a power plant and driving mechanism therefor, a clutch interposed therebetween for connecting and disconnecting the same, fluid pressure actuated mechanism for operating the clutch, a gear changing mechanism, a second fluid pressure actuated device for operating the gear change mechanism, a control valve controlling the flow of fluid to either fluid pressure mechanism, a lever for said valve, a spring holding the lever and valve in a neutral position, a pair of lines connected with the lever by means of which it may be operated from a distance to operate the control valve, a fluid pressure controlled steering device, and means whereby the pulling upon either line alone controls the flow of fluid under pressure to the steering device control mechanism.

4. In a vehicle, a power plant and driving mechanism therefor, a clutch interposed between the power plant and driving mechanism for connecting or disconnecting the same, a reverse gear mechanism, a steering means, fluid pressure actuated mechanism for each of the clutch, reverse gear, and steering mechanism, a fluid pressure supply system, a control device for discharging fluid under pressure to any of the fluid controlled mechanisms, a pair of lines for actuating the control device, movement of both lines simultaneously to a predetermined extent controlling the flow of fluid to the mechanisms for actuating the clutch and reverse gear and actuation of either line independently controlling the flow of fluid to the steering mechanism to steer the vehicle in one direction or the other depending upon the line actuated.

5. In a self-propelled vehicle, a power plant and driving mechanism therefor, a clutch for connecting and disconnecting the power plant and driving mechanism, a gear shifting device, and a steering device, fluid pressure controlled mechanism for operating each of the said clutch, gear shifting and steering mechanisms, a source of fluid pressure supply, and a line drive control device for actuating the said fluid pressure controlled mechanisms at will, said control device comprising a valve rotatable on a horizontal axis, a stem therefor movable in a vertical plane and a rotatable member on the stem, said stem and rotatable member comprising a second valve device controlling the flow of fluid to the fluid pressure mechanism for operating the steering device, a pair of lines connected with the said stem, pulling upon both lines turning the first named valve controlling the flow of fluid to the pressure controlled mechanism for operating the clutch and to that for operating a gear shifting device and pulling upon either line rotating the second named valve to correspondingly actuate the steering device.

6. In a self-propelled vehicle including a power plant and driving mechanism therefor, a clutch for connecting and disconnecting the power plant and driving mechanism, a gear shifting device, and a steering device, the combination therewith of a fluid pressure controlled mechanism for each of the said clutch, gear shifting and steering mechanisms, a source of fluid pressure supply, and a control member including a pair of lines for actuating the same in one direction and a spring to return the same to normal, the control member being adapted upon pulling upon both the lines to actuate the fluid pressure mechanism to first disconnect the clutch and thereafter to operate the corresponding fluid pressure mechanism and actuate the gear shifting mechanism, the release of the lines causing the clutch to connect the power plant and driving mechanism and a succeeding pull upon the lines causing the gear shifting mechanism to be set to neutral and a pull upon either line causing corresponding actuation of the steering mechanism.

7. In a self-propelled vehicle, the combination with a power plant and driving mechanism therefor, a clutch for connecting and disconnecting the power plant and driving mechanism, a gear shifting device and a steering device, of a fluid pressure controlled mechanism for actuation of each of the said clutch, gear shifting and steering mechanisms, of a fluid pressure supply, and a valve for controlling the flow of fluid independently to the several pressure controlled mechanisms said valve member being oscillatable in a vertical and in a horizontal plane, the construction being such that oscillation in a vertical plane controls the clutch and gear shifting mechanisms and oscillation in a horizontal plane controls the steering mechanism.

8. In a self-propelled vehicle the combination with the power plant and driving mechanism, the clutch for connecting and disconnecting the same, the gear shifting device for altering the speed or direction of movement and the steering device, of a fluid pressure controlled mechanism for the actuation of each of the said clutch, gear shifting and steering mechanisms, of a source of fluid pressure supply and a valve for controlling the flow of fluid independently to the several pressure controlled mechanisms, said valve having a portion oscillatable on a horizontal axis and a portion oscillatable on a vertical axis, a spring for yieldably holding the valve member in a predetermined position, means by which the member may be oscillated in either plane, the oscillation on the horizontal plane controlling the forward or backward movement of the machine through the clutch and gear shifting mechanisms and the oscillation on the vertical axis controlling the direction of movement of the machine in either forward or backward direction.

9. In a self-propelled vehicle having a clutch, gear shifting and steering mechanisms, the combination therewith of a fluid pressure controlled mechanism for actuating each of the clutch, gear shifting and steering mechanisms, said fluid pressure mechanism comprising a cylinder and a piston therefor, movement of the piston causing actuation of the mechanism connected therewith, a source of fluid pressure supply, a valve mechanism, a conduit from the source of supply to the valve mechanism and a conduit for each of the cylinders for the clutch, gear shifting and steering mechanisms connected with the valve member, a spring for holding the valve member in normal position releasing the cylinders from pressure, and a pair of lines connected with the valve mechanism, the construction being such that pulling upon both the lines distributes fluid first to the clutch mechanism and then to the gear shifting mechanism and pulling upon either line alone distributes fluid to cause steering of the vehicle in one direction or the other depending upon the line pulled.

10. In a self-propelled vehicle, fluid pressure controlled mechanism for actuating the clutch, gear shifting and steering mechanisms of the vehicle, a source of fluid pressure supply and a valve controlling the flow of fluid under pressure to the pressure controlled mechanisms, said valve comprising an L-shaped member having a horizontal and a vertical portion, a stationary case for the horizontal portion in which said portion is oscillatable, and an oscillatable case for the vertical portion of the valve, a spring for holding the valve in normal position, the construction being such that the fluid pressure controlled mechanisms will be relieved of pressure when the valve is in such position and oscillation of the valve on the horizontal axis distributes fluid under pressure to the pressure mechanism for the clutch and gear shifting devices and oscillation in either direction of the vertical portion of the valve member distributing fluid to cause a corresponding change in direction of movement of the vehicle.

11. In a self-propelling vehicle, a steering mechanism comprising the combination with the frame member of the vehicle, of a pivoted yoke, a fixed gear attached to the frame, the yoke being pivoted on the axis of the gear, a pair of cylinders attached to the yoke, the cylinders being disposed with the axis in alinement with opposite sides of the gear respectively, a piston for each cylinder having a rack engaging its respective side of the gear, a source of fluid pressure supply and a valve adapted to distribute fluid under pressure to either cylinder at will.

12. In a self-propelled vehicle, the combination with a power plant and driving mechanism therefor, of a clutch for connecting and disconnecting the power plant and driving mechanism, a gear shifting device controlling the speed and direction of movement of the vehicle, a cylinder, a piston therein, a lever connected with the piston adapted to disengage the clutch on outward movement of the piston, a spring for causing engagement of the clutch on relief of pressure within the cylinder, a second cylinder, a piston therein, a lever to which the piston is connected for shifting the gear on movement in one direction, a spring for operating the lever in reverse direction, a star wheel with which the piston lever is connected, the turning of the star wheel causing a point thereof to engage the lever and actuating the same and a succeeding movement of the star wheel releasing the lever to actuation by the spring, a source of fluid pressure supply, a valve member connected with the pressure supply, independent conduits from each of the said cylinders to the valve member, the valve member being such that on initial movement in one direction fluid under pressure is first distributed to the cylinder for operating the clutch and continued movement thereof distributing fluid under pressure to the cylinder for shifting the gear, a spring for holding the valve member in normal position, and means for relieving the cylinders of pressure when the valve is in normal position.

In testimony whereof, I sign this specification.

JAMES W. MOWBRAY.